United States Patent
Flanagan et al.

(10) Patent No.: US 8,812,742 B2
(45) Date of Patent: Aug. 19, 2014

(54) COMMUNICATION PATH SELECTION

(75) Inventors: John R. Flanagan, Poughkeepsie, NY (US); Francis Gassert, Monroe, NY (US); Kenneth J. Oakes, Wappingers Falls, NY (US); Dale F. Riedy, Poughkeepsie, NY (US); Peter G. Sutton, Poughkeepsie, NY (US); John Trotter, Poughkeepsie, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 13/523,958

(22) Filed: Jun. 15, 2012

(65) Prior Publication Data

US 2013/0339551 A1    Dec. 19, 2013

(51) Int. Cl.
*G06F 3/00*    (2006.01)
*H04M 1/00*    (2006.01)

(52) U.S. Cl.
USPC ........................................... 710/5; 455/456.2

(58) Field of Classification Search
None
See application file for complete search history.

(56) References Cited

U.S. PATENT DOCUMENTS

| | | | |
|---|---|---|---|
| 6,724,881 B1 | 4/2004 | McAllister et al. | |
| 6,795,858 B1 * | 9/2004 | Jain et al. | 709/226 |
| 7,373,435 B2 | 5/2008 | Carlson et al. | |
| 8,229,468 B1 * | 7/2012 | Robinson | 455/456.2 |
| 2002/0199016 A1 * | 12/2002 | Freedman | 709/241 |
| 2003/0021233 A1 * | 1/2003 | Fabre et al. | 370/238.1 |
| 2008/0101227 A1 | 5/2008 | Fujita et al. | |
| 2011/0063986 A1 | 3/2011 | Denecheau et al. | |

OTHER PUBLICATIONS z/Architecture: "Principles of Operation"; Ninth Edition, Aug. 2010, Publication No. SA22-7832-08, copyright IBM Corp. pp. 1-1476.
IBM; "Improved SCTP failover strategy using minimized common communication path selection," ip.com; IPCOM000012878D; Jun. 5, 2003, pp. 1-3.
Natarajan, KS.-et al.; "On the Selection of Communication Paths in Computer Networks," ip.com; IPCOM000148829D; Dec. 10, 1979, pp. 1-23.
Oliinowich, HT.-et al.; "Path Selection in Multi-Stage Networks Based on Availability," IBM TDB n3a, pp. 363-364; ip.com;IPCOM000101466D; Aug. 1, 1990.

* cited by examiner

*Primary Examiner* — Hyun Nam
(74) *Attorney, Agent, or Firm* — Cantor Colburn LLP; Steven Chiu

(57) ABSTRACT

A computer system includes a processor configured for detecting initial command response times of a plurality of paths for transmitting signals from the processor to one or more external devices via a plurality of channels, assigning weighted values to the plurality of paths based on the detected initial command response times, and modifying a frequency at which respective paths among the plurality of paths are selected for transmitting the signals based on the weighted values assigned to the respective paths.

20 Claims, 5 Drawing Sheets

COMMUNICATION PATH SELECTION

BACKGROUND

The present invention relates to selecting communication paths in a processing system between a subsystem and external devices. In particular, embodiments relate to maximizing communication efficiency between a subsystem and external devices by prioritizing communication paths based on initial command response times of I/O operations on the paths.

Processing systems communicate with external devices via one or more paths made up of switches and interconnection circuitry between a communication channel of the processing system and an I/O port of the external device. When multiple paths connect the processing system to the external device, the processing system may alternate which path is used to communicate with the external device. When one or more paths becomes congested due to resource contention, storage area network congestion, control unit port congestion, I/O firmware failures, or I/O hardware failures, the operation of the processor may be degraded when communication paths are routed via the congested path.

SUMMARY

Exemplary embodiments include a computer system having a plurality of channels and a processor. The processor is configured to perform a method including detecting initial command response times of a plurality of paths for transmitting signals from the processor to one or more external devices via the plurality of channels, assigning weighted values to the plurality of paths based on the detected initial command response times, and modifying a frequency at which respective paths among the plurality of paths are selected for transmitting the signals based on the weighted values assigned to the respective paths.

Additional exemplary embodiments include a method including detecting initial command response times by a processor of a plurality of paths for transmitting signals from the processor to one or more external devices via a plurality of channels, assigning weighted values by the processor to the plurality of paths based on the detected initial command response times, and modifying a frequency at which respective paths among the plurality of paths are selected for transmitting the signals based on the weighted values assigned to the respective paths.

Further exemplary embodiments include a computer program product including a tangible storage medium readable by a processing circuit and storing instructions for execution by the processing circuit for performing a method. The method includes detecting initial command response times of a plurality of paths for transmitting signals from a processor to one or more external devices via a plurality of channels, assigning weighted values to the plurality of paths based on the detected initial command response times, and modifying a frequency at which respective paths among the plurality of paths are selected for transmitting the signals based on the weighted values assigned to the respective paths.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, the initial command response (CMR) times of multiple paths are measured and accumulated along with the number of commands transmitted on the selected paths. The initial CMR is a measure of the round trip time to send an initial command to a device and receive an acknowledgement back without performing any processing or executing the command. After a predetermined period of time, or initial CMR time interval, average initial CMR times of the multiple paths are calculated and the paths are weighted based on the average initial CMR times. These weighted values (known as path weights) are incrementally adjusted, if need be, at each of these predetermined periods of time based on the average initial CMR times computed over the prior initial CMR time interval. One reason for changing the path weights in small increments is to avoid over-corrections which could lead to path usage oscillations. Thus, it will take time for the algorithm to find the "sweet spot" where each of the paths has the proper path weight to keep the initial CMR time down, while at the same time avoiding overloading a low path weight path. Another reason for incremental adjustment is that when the path weight is increased for a path and it is chosen less frequently, the average initial CMR time typically will decrease on that path. This causes the initial CMR average time on each path to come closer to the overall initial CMR average. At that point where all paths come within an acceptable, predetermined initial CMR delta of the overall initial CMR average, the proper path weight has been set and additional path weight adjustments need not be made unless conditions change that affect the initial CMR times. Path initial CMR time will continue to be monitored in subsequent initial CMR time intervals to check for initial CMR changes and make path weight adjustments if needed.

Prior to the first initial CMR time interval or for cases where all selected paths have an acceptable level of CMR time, paths are selected for transmitting commands and data based on the prior art round robin algorithm. As average initial CMR times on one or more paths increases resulting in initial CMR path weights increasing, paths with higher initial CMR times that were previously selected in round robin order from among the plurality of paths for transmitting a signal will be selected less often based on the weighted values assigned to the paths and the number of path selection attempts made in round robin order. The methods of this invention described in more detail below do not simply exclude using a path because it has a high initial CMR time. Instead, the use of paths with higher initial CMR times are scaled back based on the detected initial CMR time. Accordingly, the overall initial CMR times may be minimized and commands and data may be transmitted with increased efficiency by selecting paths having lower initial CMR times more often than paths having higher initial CMR times.

Figure 1:
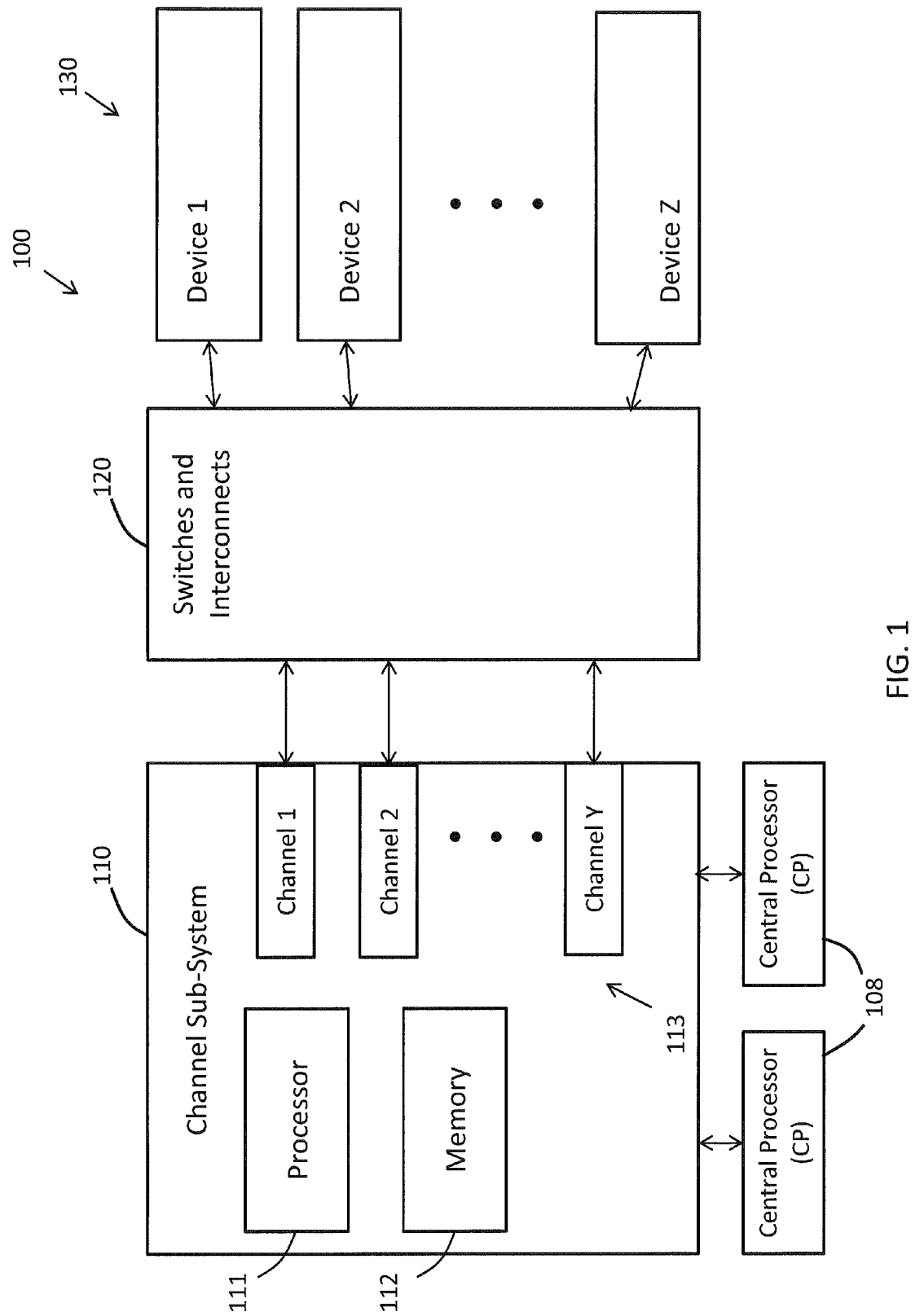
FIG. 1 illustrates a processing system according to one embodiment.

FIG. 1 illustrates a processing system 100 according to one embodiment. The processing system 100 includes a channel subsystem 110, a fabric 120 of switches and interconnects, and a plurality of devices 130. The channel subsystem 110 includes one or more processors 111 (also referred to as processing circuits 111), memory 112, and multiple channels 113. Each channel 113 corresponds to a communications port, such as a fiber optic port. The fiber optic port may correspond to any fiber optic protocol including Fibre Channel (CF) and Fibre Channel Over Ethernet (FCOE). In addition, embodiments of the present disclosure encompass any type of communication line, including serial lines, parallel lines, universal serial bus (USB) lines, optical transmission lines, electrical transmission lines, etc.

In some embodiments, the processing system 100 may also include one or more Central Processors (CPs) 108 that initiate prior art I/O related commands such as Start Subchannels (SSCH) instructions by modifying control structures in a portion of Memory 112 and then signaling one of the processors 111 (also referred to as I/O Processors or IOPs) to select one of the channels 113 to begin processing the I/O command. The process of selecting a path by the IOP to perform path selection is called I/O path selection.

The channels 113 are connected to the fabric 120 of switches and interconnects. The fabric 120 is in turn connected to the plurality of devices 130a, 130b . . . 130z. In embodiments of the present disclosure, the fabric 120 of switches and interconnects may connect one channel 113 to one device 130, or two or more channels 113 to one device 130. In addition, one channel 113 may be connected to multiple devices 130, and multiple channels 113 may be connected to multiple devices 130.

For example, each of channels 1 and 2 may be connected to device 1 via the fabric 120 of switches and interconnects. The fabric 120 of switches and interconnects may include solid state switches, such as transistors, mechanical switches or interconnects, magnetic switches or interconnects, optical switches or interconnects, or any other type of switch or interconnect corresponding to the type of channel 113 connected to the switches and interconnects. The devices 130 may be data storage devices, input/output (I/O) devices, processing devices, logic devices, or any other electrical devices.

In embodiments of the present disclosure, a path is defined as the transmission lines defined by wires, fiber optic components, printed wiring, or other conductive lines and further defined by the fabric 120 of switches and interconnects that connect a channel 113 to a device 130. Multiple channels 113 may be connected to each device 130 via multiple paths. The processor 110 may detect initial command response (CMR) times of the paths to a device 130 and may adjust selection criteria for transmitting data from the processor 110 to the device 130 via the paths based on the detected initial CMR times of the respective paths.

Figure 2:
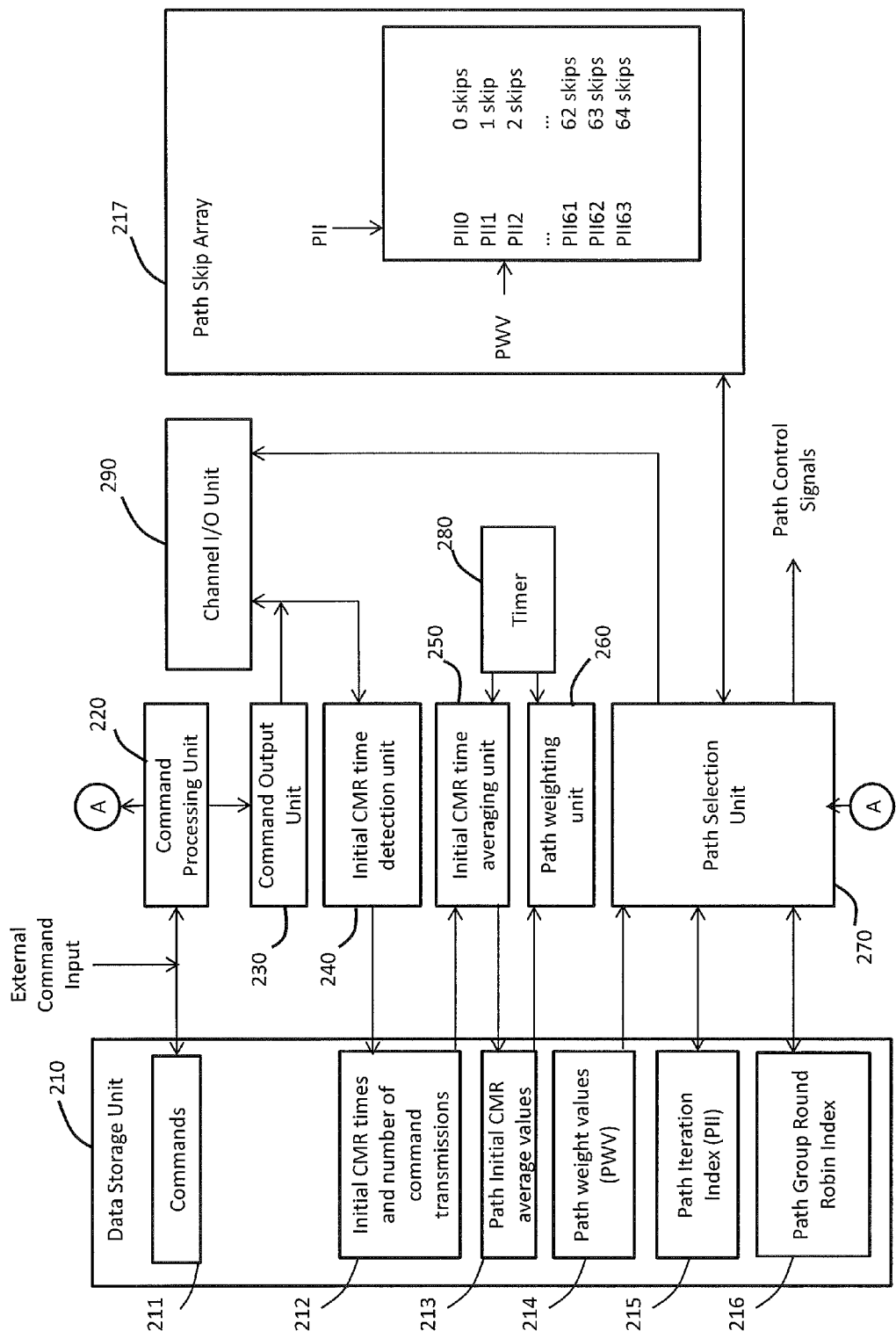
FIG. 2 illustrates a block diagram of processing elements according to one embodiment.

FIG. 2 illustrates a block diagram of processing components in the channel sub-system 110 illustrated in FIG. 1. It is understood that the channel sub-system 110 may include additional processing components, and one or more of the components illustrated in FIG. 2 may be part of devices located externally to the channel sub-system 110.

As illustrated in FIG. 2, a command processing unit 220 may receive stored commands 211 stored in a data storage unit 210 of the channel sub-system 110 or a memory device external to the channel sub-system 110. This data storage unit 210 may reside in a portion of the memory 112. The command processing unit 220 may further receive commands from an external command input such as central processing units 108 illustrated in FIG. 1. Upon processing the command for execution, the command is transmitted to a command output unit 230, and from the command output unit 230 to the channel I/O unit 290. The channel I/O unit 290 may include an I/O port and any buffer or processing unit for storing or processing data input from or output to the I/O port.

An initial CMR time detection unit 240 detects a time for the command or data to reach a device 130 (see FIG. 1) connected to the channel I/O unit 290 via a communications path. In one embodiment of the present disclosure, the channel I/O unit 290 includes multiple channels, and multiple channels may be connected to a single device 130 via multiple paths. In another embodiment, one channel 113 is connected to a one device 130, and multiple paths are located between the channel 113 and the device 130. The initial CMR detection unit 240 calculates the initial CMR time and accumulates the initial CMR times 212 and the number of command transmissions for each communications path connected to the channel I/O unit 290 in the data storage unit 210.

An initial CMR time averaging unit 250 accesses the accumulated initial CMR times 212 and the number of command transmissions stored in the data storage unit 210 and averages the initial CMR times for each respective path connecting an I/O channel 113 to a device 130. For example, if eight channels 113 are connected to one device 130a via eight respective communication paths, the initial CMR time detection unit 240 detects the initial CMR times for each of the eight paths, and the initial CMR time averaging unit 250 averages the initial CMR times detected over a period of time or a predetermined number of command transmissions for each path. For example, in an embodiment in which eight paths connect eight channels 113 to one device 130a, the initial CMR time averaging unit 250 generates eight average initial CMR time values, or one average initial CMR time value for each path.

The initial CMR time averaging unit 250 stores the initial CMR time average values 213 for each path in the data storage unit 210. A path weighting unit 260 accesses the initial CMR time average values 213 for each path, adjusts a path weight value 214 for each path having an average initial CMR time outside an acceptable, predetermined initial CMR path average delta from the overall initial CMR average, and stores the path weight values 214 for each path in the data storage unit 210.

A path selection unit 270 receives from the command processing unit 220, illustrated as output/input A, a signal indicating an external device 130 to be accessed, and controls the channel I/O unit 290 to utilize a channel 113 according to the stored path weight values (PWV) 214 along with using the path iteration index (PII) 215 for the corresponding path to index into the path skip array 217 to determine if the path should be selected or skipped. The path weighting unit 260 increments a path's PWV 214 in a manner described in greater detail later in this disclosure. The path selection unit 270 increments the PII 215 for a path each time that path comes up for selection in round robin order based on a path group round robin index (PGRRI) 216. For example, when the path skip array 217 stores sixty-four PIIs, then when the PII selector is incremented past sixty-three it may wrap back to a value of 0 to indicate selection of a first PII in the array of PIIs. In one embodiment, there is one PGRRI 216 for each set of devices that are accessed by the same set of paths (path group). In addition, there may be one PII 215 for each path within that set of paths managed by the PGRRI 216.

The path skip array 217 may be a two-dimensional array which uses the PWV as the first dimension to point to the element containing the number of desired skips (between 0 skips and 64 for always skip) and the PII as the second dimension to index into the 64 bit path skip array element. Each 64 bit element in the Path Skip Array 217 is designed to evenly distribute as best as possible the number of desired skips based on the PII. If the selected bit in the Path Skip Array is 0, the path will be skipped for this iteration. If 1, the path will be selected. If a path is skipped, the use of the next path's PWV and PII along with the path skip array as previously described is applied to the next path in the path group round robin rotation. This method allows the path selection unit 270 to "throttle back" the use of the paths with higher initial CMR times without having to completely stop using them.

The path selection unit 270 also outputs path control signals to control the states of switches and interconnects between the channel I/O unit 290 and an external device 130. The path control signals may include signals to control transistor gates, light transmission states, physical switch positions, or any other switches or interconnects defining a path between the channel I/O unit 290 and an external device 130.

In one embodiment, the path selection unit 270 controls the channel I/O unit 290 and the switches and interconnects 120 to select a path for data transmission based solely on the stored path weight values, such that a path having a lower path weight value is selected for data transmission more often than a path having a higher path weight value. In another embodiment, the path selection unit 270 controls the channel I/O unit 290 and the switches and interconnects 120 to select a path for data transmission based on a round-robin selection process modified based on the path weight values. In one embodiment, when a path has a path weight value that exceeds a predetermined threshold, the path is omitted from a group of paths eligible for selection by the path selection unit 270.

A timer 280 located within the processor 110 or located external to the processor 110 outputs a trigger signal after a predetermined period of time. In one embodiment, after the predetermined period of time, the initial CMR time averaging unit 250 is triggered to calculate the average initial CMR times. In another embodiment, after the predetermined period of time, the path weighting unit 260 is triggered to calculate the path weights. In other words, in one embodiment of the present disclosure, the initial CMR time average values for the paths or the path weights are not calculated continually. Instead, the initial CMR time average values for the paths or the path weights are calculated upon receiving the trigger signal from the timer 280.

In one embodiment, upon initialization, each path weight value 214 of the paths connecting one or more channels 113 to a device 130 is zero, and the path selection unit 270 controls the channel I/O unit 290 and the switches and interconnects 120 to select a path based on a round-robin process, in which each path is selected in sequence to transmit data to a device 130 in a next data transmission operation. After a predetermined period of time has elapsed, as measured by the timer 280, the initial CMR time averaging unit 250 averages the initial CMR times of the paths based on the stored initial CMR times measured during the predetermined period of time. In one embodiment, the period of time is between three and five seconds. For example, in one embodiment, the period of time is about four seconds.

The path weighting unit 260 may compare each path's average initial CMR time with the average initial CMR time of all of the paths. If a path's average initial CMR time is within a predetermined time range of the average initial CMR time of all of the paths, the path weighting unit 260 leaves the path weight value at a present value. On the other hand, if the path's average initial CMR time is equal-to or outside the predetermined time range, the path weighting unit 260 may adjust the path weight value of the path by a predetermined level.

In one embodiment, the predetermined time range is between 300 and 500 microseconds. For example, in one embodiment, the predetermined time range is 384 microseconds. In one embodiment, the path weighting unit 260 adjusts the path weight value of a path by between 1% and 3%. For example, the path weight value may be adjusted by about 1.5%, which may correspond to the path being skipped one more time out of 64 round-robin cycles. In other words, when the path weights are the same, each path is selected in sequence in each round-robin cycle. Once the path weights are adjusted, one or more of the paths may be skipped after a number of round-robin cycles corresponding to the path weight, and thus paths having higher initial CMR times may be accessed less often than paths having lower initial CMR times.

In exemplary embodiments, the path weights are incremental path weights between zero, corresponding to no-skipping, and a predetermined limit, such as 64. At the end of each predetermined time period, the path weights may be adjusted by one incremental unit until the path weight reaches the predetermined limit. In other words, the path weight does not correspond to only two states of "always select-eligible" or "skip always" state, but rather corresponds to a series of states in which the path is skipped more often as the weight increases. However, it is understood that a "skip always" state may also be implemented in addition to the incremental weighting, such as when an initial CMR time reaches a skip threshold limit, indicating a stalled path or a critically slow path. It should also be understood that in certain embodiments it may be beneficial to place a cap on the path weight such that a path is not perpetually skipped even if that path's average initial CMR time is always equal-to or outside the predetermined time range for incrementing the path weight.

In one embodiment, if it is determined by the path weighting unit 260 that no paths have a zero path weight, indicating that the path is not skipped in any round-robin cycle, then the paths weights of each path may be reduced by the lowest path weight, such that at least one path has a path weight of zero. In one embodiment, when no starts occur, or no I/O operations access the paths via the channel I/O unit 290 during the predetermined period of time, then all of the path weights may be adjusted to zero.

Embodiments of the present disclosure, including the processing system and channel sub-systems of FIGS. 1 and 2, are further described in "IBM® z/Architecture Principles of Operation," Publication No. SA22-7832-08, 9th Edition, August, 2010 which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 3:
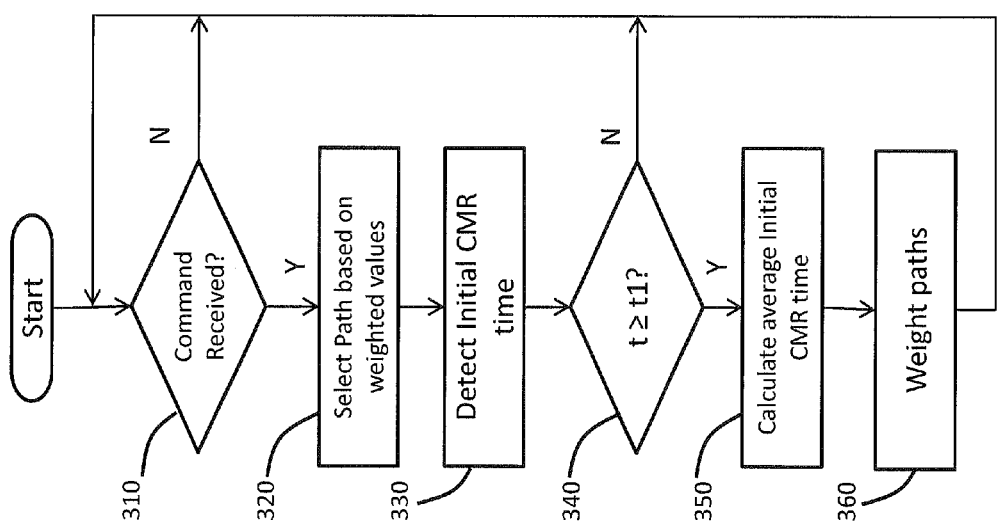
FIG. 3 illustrates a flow chart of a method for selecting paths for transmitting data according to one embodiment.

FIG. 3 illustrates a method for selecting communication paths according to one embodiment. In block 310, it is determined whether a command or data communication operation is received. In block 320, a path for transmitting the command or data is selected based on weighted values of paths between I/O channels of a channel sub-system and an external device. If the command or data communication operation is a first operation after initialization or start-up, then the path weights associated with all the paths may be initialized to zero. For example, in some embodiments, multiple I/O channels of a channel sub-system are connected to a same external device via a fabric of switches and interconnects, such that multiple communication paths exist between the channel sub-system and the external device. Each channel of the channel sub-system may correspond to a separate path to a specific external device, and one channel of the channel sub-system may correspond to multiple paths of various devices based on the states of the switches and interconnects.

In block 330, an initial command response (CMR) time of the data communication is detected. The initial CMR time may correspond to a time required to transmit the command or data from the channel sub-system to the external device, or may include a round-trip time to transmit the command or data from the channel sub-system to the external device and to receive a response, confirmation, or timing data from the external device.

In block 340, it is determined whether a period of measured time t is equal to or greater than a threshold time t1. If it is determined in block 340 that the period of measured time t is equal to or greater than a threshold time t1, then an average initial CMR time of each path is calculated in block 350 and in block 360, the paths are weighted based on the average initial CMR times. In blocks 310 through 330, the operations of receiving commands, selecting paths, and detecting or measuring initial CMR times of the paths are performed as commands are received.

Accordingly, communication between a channel sub-system and one or more devices may be carried out with increased efficiency by increasing a frequency at which communication paths having lower initial CMR times are accessed, and decreasing a frequency at which communication paths having higher initial CMR times are accessed. In addition, since the operations of calculating average initial CMR times of paths or calculating path weights is performed only after a predetermined period of time has elapsed, instead of recalculating path weights after each command or data transmission operation, resources of the channel sub-system are freed up, and processing performance may increase further.

Figure 4:
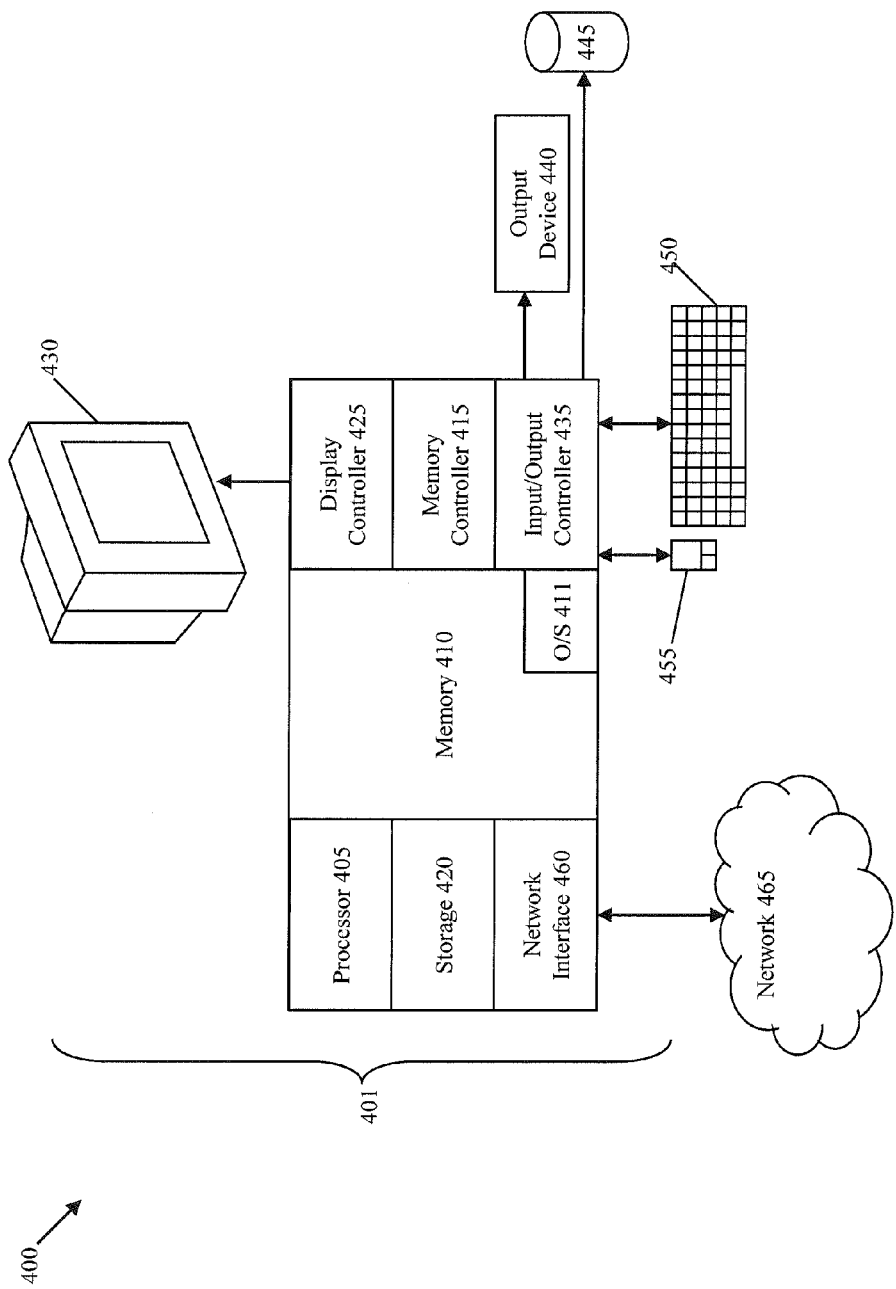
FIG. 4 illustrates a block diagram of a system for selecting communication paths between a processor and one or more external devices.

Embodiments of the present disclosure encompass any type of computing system, including mainframe systems, server systems, personal computing systems, or any other type of computing system in which multiple communication paths exist between channel sub-systems and an external device. FIG. 4 illustrates a block diagram of a system 400 for selecting communication paths between a processor 405 and one or more external devices. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore includes general-purpose computer 401.

In an exemplary embodiment, in terms of hardware architecture, as shown in FIG. 4, the computer 401 includes a processor 405, memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions. The processor 405 is a multi-threading processor, and may further be a multi-core processor. Each core of the multi-core processor may be a multi-threading core.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 a suitable operating system (OS) 411. The operating system 411 essentially controls the execution of other computer programs and provides scheduling, input-output control, file and data management, memory management, and communication control and related services.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute instructions stored within the memory 410, to communicate data to and from the memory 410, and to generally control operations of the computer 401 pursuant to the instructions.

The processor 405 may correspond to the processor 110 of FIG. 1, and the storage 420, network interface 460, display controller 425, memory controller 415, memory 410, input/output controller 435, and I/O devices 440 and 445 may correspond to devices 130 of FIG. 1.

In an exemplary embodiment, path selection methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
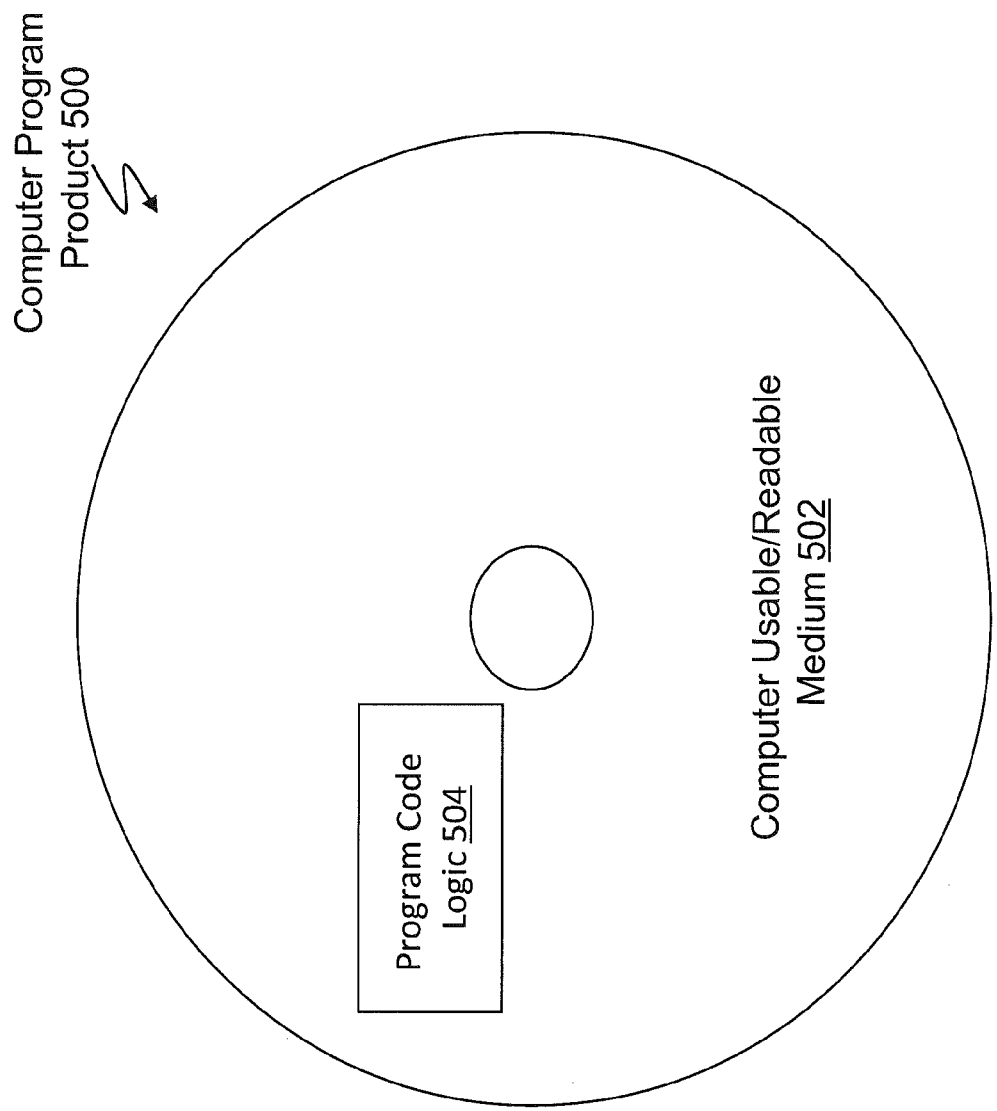
FIG. 5 illustrates a computer program product according to an embodiment.

As described above, embodiments can be embodied in the form of computer-implemented processes and apparatuses for practicing those processes. An embodiment may include a computer program product 500 as depicted in FIG. 5 on a computer readable/usable medium 502 with computer program code logic 504 containing instructions embodied in tangible media as an article of manufacture. Exemplary articles of manufacture for computer readable/usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention had been described, it will be understood that those skilled in the art, both now and in the future, may make various improvements and enhancements which fall within the scope of the claims which follow.

What is claimed is:

1. A computer system, comprising:
  a plurality of channels; and
  a processor configured to perform a method, the method comprising:
    detecting initial command response times of a plurality of paths for transmitting signals from the processor to one or more external devices via the plurality of channels, the initial command response times being a measure of a round-trip time to send an initial command to the one or more devices and to receive an acknowledgement back without executing the initial command;
    assigning weighted values to the plurality of paths based on the detected initial command response times; and
    modifying a frequency at which respective paths among the plurality of paths are selected for transmitting the signals based on the weighted values assigned to the respective paths.

2. The computer system of claim 1, further comprising:
  accumulating initial command response times of the plurality of paths for a predetermined period of time;
  determining whether the predetermined period of time has elapsed; and
  assigning the weighted values to the plurality of paths based on determining that the predetermined period of time has elapsed.

3. The computer system of claim 1, further comprising:
  calculating average initial command response times of the plurality of paths,
  wherein the weighted values are assigned to the plurality of paths based on the average initial command response times of the plurality of paths.

4. The computer system of claim 3, further comprising determining whether a predetermined period of time has elapsed,
  wherein the average initial command response times of the plurality of paths are calculated based on determining that the predetermined period of time has elapsed.

5. The computer system of claim 1, wherein the plurality of paths includes switches and interconnects between the plurality of channels and the external devices.

6. The computer system of claim 1, wherein the respective paths among the plurality of paths are selected for transmitting the signals based on a round-robin order of selection modified by the weighted values assigned to the respective paths.

7. The computer system of claim 1, further comprising:
  determining that one or more paths from among the plurality of paths has an initial command response time greater than a predetermined threshold initial command response time; and
  removing the one or more paths from among a group of paths eligible for selection for transmitting the signal based on the determination that the one or more paths has an initial command response time greater than the predetermined threshold initial command response time.

8. The computer system of claim 1, wherein assigning the weighted values to the plurality of paths based on the detected initial command response times comprises:
  determining whether an initial command response time of one or more paths of the plurality of paths is within a predetermined range of an average initial command response time of all of the paths;
  adjusting a path weight of the one or more paths based on determining that the average response time of the one or more paths is outside the predetermined range.

9. The computer system of claim 8, wherein adjusting the path weight of the one or more paths includes adjusting the path weight of the one or more paths between 1% and 3% to cause the one or more paths to be skipped one more time in a next 64 path selection operations.

10. A method comprising:
    detecting initial command response times by a processor of a plurality of paths for transmitting signals from the processor to one or more external devices via a plurality of channels, the initial command response times being measures of a round trip time to send an initial command to the one or more external devices and receive acknowledgements back without executing the initial command;
    assigning weighted values by the processor to the plurality of paths based on the detected initial command response times; and
    modifying a frequency at which respective paths among the plurality of paths are selected for transmitting the signals based on the weighted values assigned to the respective paths.

11. The method of claim 10, further comprising:
    determining whether a predetermined period of time has elapsed; and
    assigning the weighted values based on determining that the predetermined period of time has elapsed.

12. The method of claim 10, further comprising:
    calculating average initial command response times of the plurality of paths,
    wherein the weighted values are assigned to the plurality of paths based on the average initial command response times of the plurality of paths.

13. The method of claim 12, further comprising determining whether a predetermined period of time has elapsed, wherein the average initial command response times of the plurality of paths are calculated based on determining that the predetermined period of time has elapsed.

14. The method of claim 10, wherein respective paths among the plurality of paths are selected for transmitting the signals based on a combination of both the weighted value assigned to the first path and a round robin order of selecting paths from for transmitting the signals from among the plurality of paths.

15. The method of claim 10, further comprising:
    determining that one or more paths from among the plurality of paths have an initial command response time greater than a predetermined threshold initial command response time; and
    removing the one or more paths from eligibility to be selected for transmitting the signal based on the determination that the one or more paths have an initial command response time greater than the predetermined threshold initial command response time.

16. A computer program product comprising:
    a non-transitory storage medium readable by a processing circuit and storing instructions for execution by the processing circuit for performing a method comprising:
    detecting initial command response times of a plurality of paths for transmitting signals from a processor to one or more external devices via a plurality of channels, the initial command response times being measures of a round trip time to send an initial command to the one or more external devices and receive acknowledgements back without executing the initial command;
    assigning weighted values to the plurality of paths based on the detected initial command response times; and
    modifying a frequency at which respective paths from among the plurality of paths are selected for transmitting a signal based on a weighted value assigned to the respective paths.

17. The computer program product as claimed in claim 16, wherein the method further comprises calculating average initial command response times of the plurality of paths, and wherein the weighted values are assigned to the plurality of paths based on the average initial command response times of the plurality of paths.

18. The computer program product as claimed in claim 17, wherein the method further comprises determining whether a predetermined period of time has elapsed, and wherein the average initial command response times of the plurality of paths are calculated based on determining that the predetermined period of time has elapsed.

19. The computer program product as claimed in claim 16, wherein respective paths from among the plurality of paths are selected for transmitting the signal based on a combination of both the weighted value assigned to the respective paths and a round robin order of selecting paths from among the plurality of paths.

20. The computer program product as claimed in claim 16, wherein assigning the weighted values to the plurality of paths based on the detected initial command response times comprises:
    determining whether an initial command response time of each path of the plurality of paths is within a predetermined range of an average initial command response time of all of the paths; and
    adjusting a path weight of each path having an average response time that is outside the predetermined range.

* * * * *